United States Patent
Yang et al.

(10) Patent No.: US 10,272,394 B2
(45) Date of Patent: Apr. 30, 2019

(54) CROSSLINKED POLYMERIC BLENDED MEMBRANES FOR GAS SEPARATION

(71) Applicant: Saudi Arabian Oil Company, Dhahran (SA)

(72) Inventors: Junyan Yang, Acton, MA (US); Daniel Harrigan, Cambridge, MA (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 15/691,372

(22) Filed: Aug. 30, 2017

(65) Prior Publication Data

US 2019/0060845 A1  Feb. 28, 2019

(51) Int. Cl.
  *C08J 3/24* (2006.01)
  *C08J 5/18* (2006.01)
  (Continued)

(52) U.S. Cl.
  CPC .......... *B01D 71/80* (2013.01); *B01D 53/228* (2013.01); *B01D 67/0006* (2013.01);
  (Continued)

(58) Field of Classification Search
  CPC .............. B01D 53/228; B01D 67/0006; B01D 67/0013; B01D 71/52; B01D 71/56;
  (Continued)

(56) References Cited

U.S. PATENT DOCUMENTS

| | | |
|---|---|---|
| 8,317,900 B2 | 11/2012 | Peinemann et al. |
| 2011/0120304 A1 | 5/2011 | Peinemann et al. |
| 2013/0078462 A1* | 3/2013 | Liu .................. B32B 7/12 |
| | | 428/352 |

FOREIGN PATENT DOCUMENTS

| | | |
|---|---|---|
| CN | 103894081 B | 7/2015 |
| CN | 107008166 A | 8/2017 |

OTHER PUBLICATIONS

Sridhar, S. et al., "Development of crosslinked poly(ether-block-amide) membrane for CO2/CH4 separation", Colloids and Surfaces A: Physiochem. Eng. Aspects, 297, 2007, pp. 267-274. (Year: 2007).*

(Continued)

*Primary Examiner* — Jason M Greene
(74) *Attorney, Agent, or Firm* — Dinsmore & Shohl, LLP; Jennifer Lunn

(57) ABSTRACT

Methods of making a gas separation membrane, a gas separation membrane, and method of gas separation. The gas separation membrane includes cross-linked poly(ether-b-amide) copolymer, in which the poly(ether-b-amide) copolymer comprise urethane crosslinks which is the reaction product of poly(ether-b-amide) copolymer and diisocyanate polyether according to formula (I):

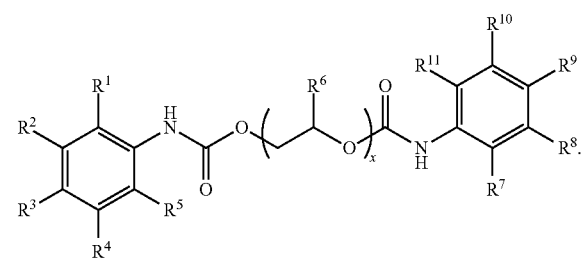

23 Claims, 7 Drawing Sheets

(51) Int. Cl.
*C10L 3/10* (2006.01)
*B01D 53/22* (2006.01)
*B01D 67/00* (2006.01)
*B01D 71/52* (2006.01)
*B01D 71/56* (2006.01)
*B01D 71/80* (2006.01)

(52) U.S. Cl.
CPC ......... *B01D 67/0013* (2013.01); *B01D 71/52* (2013.01); *B01D 71/56* (2013.01); *C08J 3/24* (2013.01); *C08J 5/18* (2013.01); *C10L 3/104* (2013.01); *B01D 2323/30* (2013.01); *C08J 2371/00* (2013.01); *C08J 2377/00* (2013.01); *C10L 2290/548* (2013.01)

(58) Field of Classification Search
CPC ........ B01D 71/80; B01D 2323/30; C08J 3/24; C08J 5/18; C10L 3/104; C10L 2290/548
See application file for complete search history.

(56) References Cited

OTHER PUBLICATIONS

International Search Report and Written Opinion pertaining to International Application No. PCT/US2017/064664, filed Dec. 5, 2017, 21 pages.

Sridhar et al., "Development of Crosslinked Poly(Ether-Block-Amide) Membrane for CO2/CH4 Separation", Colloids and Surfaces A: Physiochem. Eng. Aspects, 2007, 297, 267-274.

Cao et al., "Chemical Cross-Linking Modification of 6FDA-2,6-DAT Hollow Fiber Membranes for Natural Gas Separation", Journal of Membrane Science, 2003, 216, 257-268.

Liu et al., "Chemical Cross-Linking Modification of PolyimidelPoly(ethersulfone) Dual-Layer Hollow-Fiber Membranes for Gas Separation", Ind. Eng. Chem. Res., 2003, 42, 1190-1195.

Liu et al., Recent progress in the design of advanced PEO-containing membranes for CO2 removal, Progress in Polymer Science, 2013, 38, 1089-1120.

Murali et al., "Gas Permeation Behavior of Pebax-1657 Nanocomposite Membrane Incorporated with Multiwalled Carbon Nanotubes", Ind. Eng. Chem. Res., 2010, 49, 6530-6538.

Robeson, L.M., "Correlation of separation factor versus permeability for polymeric membranes", Journal of Membrane Science, 1991, 62, 165-185.

Robeson, L.M., "The Upper Bound Revisited", Journal of Membrane Science, 2008, 320, 390-400.

Sanders et al., "Energy-efficient polymeric gas separation membranes for a sustainable future: A review", Polymer, 2013, 54, 4729-4761.

Wakui et al., "Dehydrogenative cracking of n-butane using double-stage reaction", Applied Catalysis A: General, 2002, 230, 195-202.

\* cited by examiner

CROSSLINKED POLYMERIC BLENDED MEMBRANES FOR GAS SEPARATION

TECHNICAL FIELD

Embodiments of the present disclosure generally relate to membranes of crosslinked poly(amide-b-ether) with diisocyanate polyether, methods of making the membranes, and methods of separating gas streams with the membranes.

BACKGROUND

Natural gas is an energy source that may decrease the reliance on liquid fuel for the generation power. However, many natural gas reservoirs contain a complex mixture of acid gases (such as carbon dioxide ($CO_2$) and hydrogen sulfide ($H_2S$)), higher value heavy hydrocarbons, inert gases, and trace components of many other compounds. At high concentrations, $CO_2$ or $H_2S$ in combination with water is corrosive, and, therefore, can destroy pipelines or other equipment. Furthermore, the presence of $CO_2$ reduces the heating value of natural gas. Therefore, natural gas from natural gas reservoirs or "produced gas" is processed prior to distribution and usage. The bulk removal of these gases will decrease the post-membrane treatment units (such as acid gas amine scrubbing and cryogenic condensation) and will increase the feed gas quality and flow.

Membrane technology has become a popular alternative for efficient gas separation process. Due to the manufacturability, low material costs, robust physical characteristics, and good intrinsic transport properties, as compared to the conventional method for acid gas separation (for example, acid gas amine scrubbing), polymeric membranes are of great research interest in the membrane technology field. However, polymeric membranes designed for gas separations are known to have a trade-off between permeability and selectivity. In addition, there are other significant material challenges, such as physical aging and plasticization.

Glassy polymers, such as cellulose acetate (CA), polyinmide (PI), and polysulfone (PSF), are used for sour gas removal from natural gas, due to their high thermal stability. CA polymer membranes may be used for $CO_2$ separation and exhibit high pure gas carbon dioxide/methane ($CO_2/CH_4$) selectivity of approximately 30 Barrer. However, due to easy plasticization at high $CO_2$ pressure or in the presence of significant amounts of higher-hydrocarbon contaminants, glassy polymers, such as CA, exhibit much lower $CO_2/CH_4$ mixed gas selectivities and exhibit very low $CO_2$ permeability (approximately 5 Barrer is equivalent to $3.75 \times 10^{-17}$ $m^2 \cdot s^{-1} \cdot Pa^{-1}$), which does not meet some industrial requirements. Similarly, another commercially available polyimide exhibits higher $CO_2/CH_4$ pure gas selectivity of 40 Barrer, but still much lower $CO_2$ permeability of less than 12 Barrer (which is equivalent to $9.00 \times 10^{-17}$ $m^2 \cdot s^{-1} \cdot Pa^{-1}$).

SUMMARY

Ongoing needs exist to obtain polymer membranes that have a high $CO_2$ permeability, high thermal stability, and high $CO_2/CH_4$ pure gas selectivity. The membranes in this disclosure achieve a high $CO_2$ permeability, high thermal stability, a resistance to plasticization, and high $CO_2/CH_4$ pure gas selectivity.

One or more embodiments of this disclosure include methods of making a gas separation membrane. In embodiments, the methods for making gas separation membranes include dissolving a poly(ether-b-amide) (PEBA) copolymer in a solvent to form a polymer solution; casting the polymer solution into a mold; evaporating the solvent to form a film; submerging the film in a crosslinking solution to form a crosslinked film, wherein the crosslinking solution comprises a diisocyanate polyether according to formula (I); and drying the film to form the gas separation membrane.

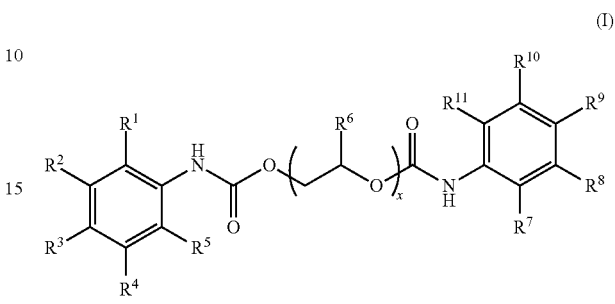

In formula (I), $R^6$ is independently an alkyl or —H; x is from 1 to 200; and $R^1$, $R^2$, $R^3$, $R^4$, $R^5$, $R^7$, $R^8$, $R^9$, $R^{10}$, and $R^{11}$ is independently —C=N=O, alkyl or —H, provided that at least one and not more than two of $R^1$, $R^2$, $R^3$, $R^4$ and $R^5$ is —C=N=O and at least one and not more than two of $R^7$, $R^8$, $R^9$, $R^{10}$, and $R^{11}$ is independently —C=N=O.

In some embodiments, methods of making a gas separation membrane include dissolving a poly(ether-b-amide) (PEBA) copolymer and an amount of a diisocyanate polyether according to formula (I) in a solvent to form a polymer crosslinking solution; casting the polymer crosslinking solution into a mold; evaporating the solvent to form a film; drying the film to form the gas separation membrane.

In embodiments, a gas separation membrane includes cross-linked poly(ether-b-amide) copolymer, in which the poly(ether-b-amide) copolymer comprises one or more urethane crosslinks which is the reaction product of poly(ether-b-amide) copolymer and diisocyanate polyether according to formula (I).

In embodiments, methods of gas separation include flowing a gas stream through a gas separation membrane, the gas separation membrane comprising a polyether block amide (PEBA) crosslinked by a diisocyanate polyether according to formula (I), and then separating the gases via the gas separation membrane.

DETAILED DESCRIPTION

Figure 1:
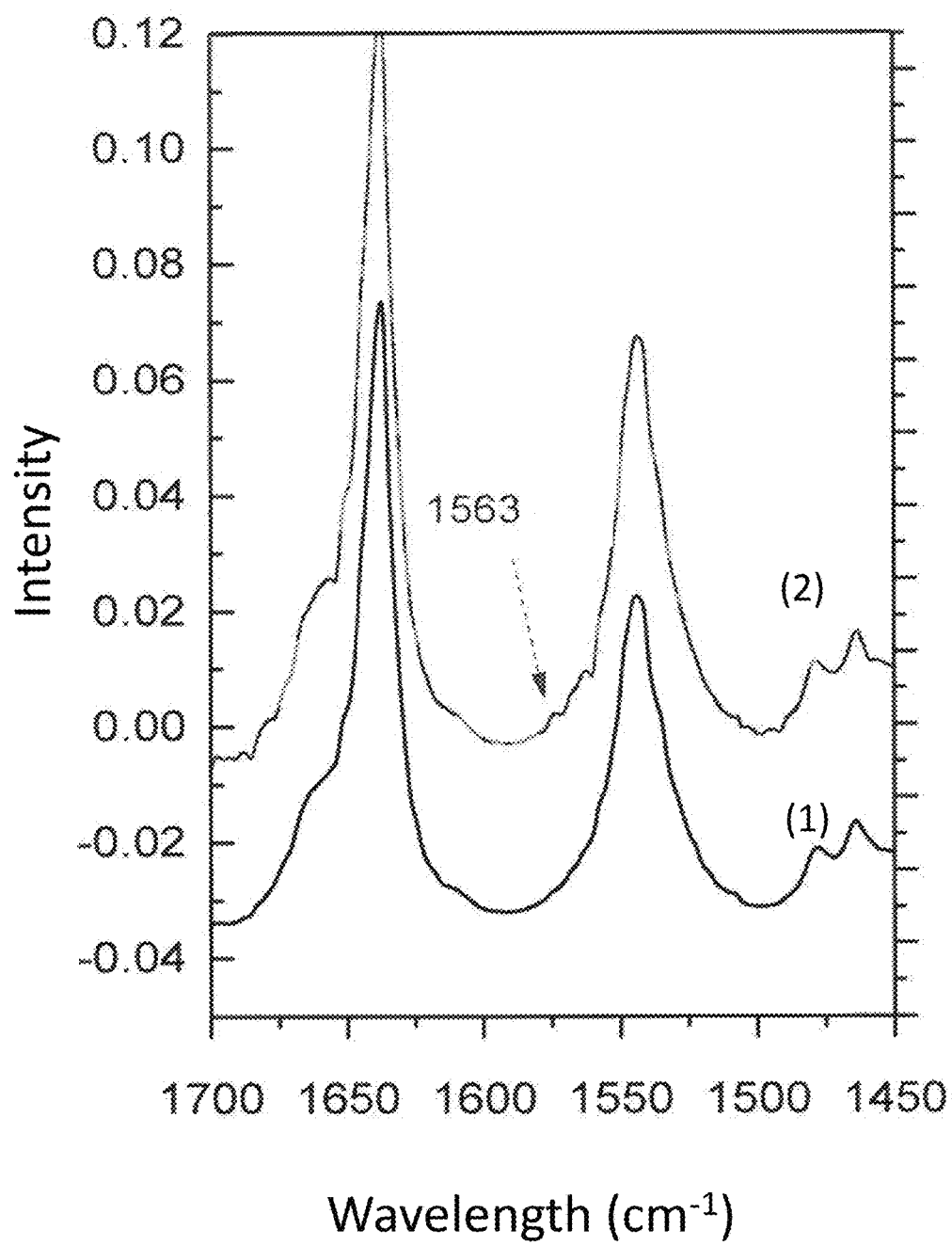
FIG. 1 is a stacked Fourier Transform Infrared (FTIR) spectra, intensity versus wavelength per centimeter ($cm^1$), of uncrosslinked poly(amide-b-ether), specifically Pebax®, (1) and crosslinked Pebax® with diisocyanate polyether (2).

Embodiments of the present disclosure are directed to membranes produced by crosslinking polymer mixtures of diisocyanate-terminated poly(ethylene glycol) and poly(ether-b-amide) copolymers, methods of making the membranes, and methods of separating produced gas using these membranes, where the membranes have improved selectivity separating hydrocarbons and greenhouse gases, such as carbon dioxide and methane.

The term "alkyl" means a saturated straight or branched, saturated or unsaturated hydrocarbon radical of from 1 to 50 carbon atoms. Examples of unsubstituted alkyl include, but are not limited to, methyl; ethyl; 1-propyl; 1-butyl; 1-pentyl; 1-hexyl; 1-heptyl; 1-nonyl; and 1-decyl. Examples of substituted alkyl include, but are not limited to, 2-propyl; trifluoromethyl; 1-methylethyl; 2-butyl; 2-methylpropyl; or 1,1-dimethylethyl.

The term "—H" means a hydrogen or hydrogen radical that is covalently bonded to another atom. "Hydrogen" and "—H" are interchangeable, and unless clearly specified have identical meanings.

In one or more embodiments, a gas separation membrane includes cross-linked poly(ether-b-amide) (PEBA) copolymer. The PEBA copolymer forms crosslinks through the addition of a diisocyanate polyether. The poly(ether-b-amide) copolymer reacts with the isocyanate groups of the diisocyanate polyether and forms a urethane functional group, thereby crosslinking one PEBA strand with another PEBA. The diisocyanate polyether may include a structure according to formula (I):

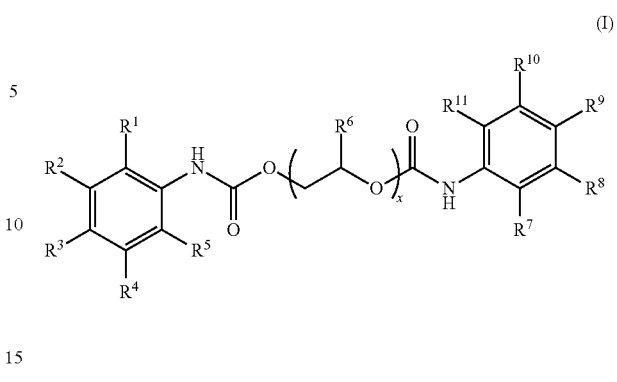

In formula (I), each $R^6$ is independently an alkyl or —H; subscript x is from 1 to 200. $R^1$, $R^2$, $R^3$, $R^4$, $R^5$, $R^7$, $R^8$, $R^9$, $R^{10}$, and $R^{11}$ is independently —C=N=O, alkyl or —H, provided that one of $R^1$, $R^2$, $R^3$, $R^4$ and $R^5$ is —C=N=O, and one of $R^7$, $R^8$, $R^9$, $R^{10}$, and $R^{11}$ is —C=N=O. The alkyl may have 1 to 20 carbon atoms. In some embodiments of the diisocyanate polyether according to formula (I), $R^6$ is methyl, ethyl, propyl, 2-propyl, n-butyl, tert-butyl, pentyl, hexyl, heptyl, octyl, nonyl, or —H.

The formula "—C=N=O" may be referred to using the term "isocyanate." The term "isocyanate" and the formula "—C=N=O" may be interchangeable. In some embodiments of the diisocyanate polyether according to formula (I), $R^4$ and $R^8$ are —C=N=O; $R^3$ and $R^9$ are methyl; and $R^6$ is methyl.

In some embodiments, the diisocyanate polyether according to formula (I), x may be an integer from 2 to 200, 50 to 180, 75 to 170, 20 to 100, or from 2 to 50. In some embodiments, the diisocyanate polyether has a weight average molecular weight of approximately 400 grams per mole (g/mol) to 10,000 g/mol, 425 to 900 g/mol, or approximately 700 g/mol.

When the PEBA copolymer reacts with the diisocyanate polyether of formula (I), the gas separation membrane is formed, and the PEBA copolymers are linked through urethane groups formed when an isocyanate group of the diisocyanate polyether reacts with the carboxylic acid or alcohol functional group of the PEBA. Scheme 1 illustrates the reaction and the reaction product of diisocyanate polyether and PEBA, but it not meant to be defining or limiting.

Scheme 1: Reaction Product of PEBA and Diisocyanate Polyether

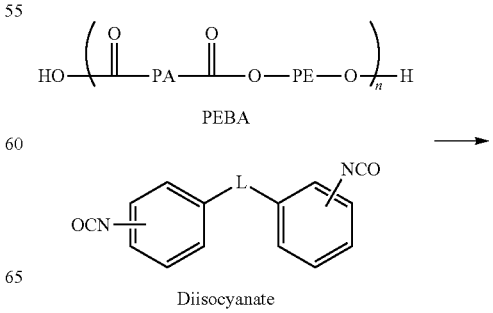

-continued

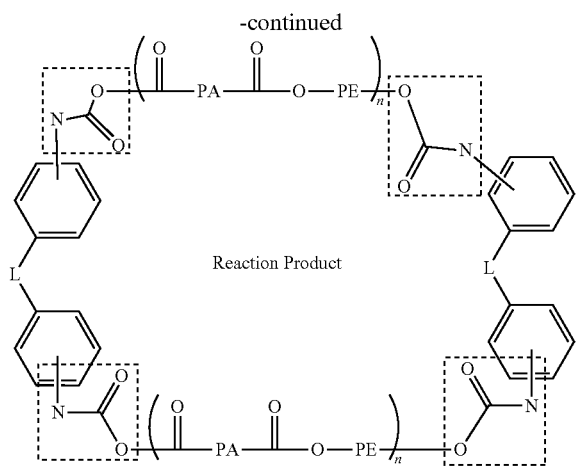

Reaction Product

In Scheme 1, PEBA is a polyether block amide, in which the PA represents the polyamide segments, PE represents the polyether segments, and n is an arbitrary number greater than 1. The diisocyanate in Scheme 1 is representative of diisocyanate polyether of formula (I), in which L links one isocyanate group with the other isocyanate group. The urethane groups linking the diisocyanate and the PEBA copolymer in the Reaction Product are surrounded by dashed rectangles. As previously mentioned, Scheme 1 is merely illustrative. For example, in Scheme 1, two diisocyanate molecules crosslink the same two PEBA copolymers. In the gas separation membrane, it is improbable, but not impossible, that the two diisocyanate polyether will crosslink the same two PEBA copolymers as depicted in Scheme 1.

In one or more embodiments, the gas separation membrane may include from 1 to 99 weight percent (wt. %) of poly(ether-b-amide) (PEBA) copolymer. In some embodiments, the gas separation membrane may include from 50 to 98 wt. % of PEBA based on the total weight of the gas separation membrane. In other embodiments, the gas separation membrane may include PEBA in amounts from 70 to 95 wt. %, 75 to 95 wt. %, or 80 to 95 wt. % based on the total weight of the gas separation membrane.

In some embodiments, the PEBA copolymer can include a soft segment of from 25% to 80% by weight and a hard segment of from 75% to 20% by weight. As used within this disclosure, the term "hard segment" refers to the polyamide segments, and the term "soft segment" refers to the polyethylene glycol segments. Such polymers are available commercially as various grades such as Pebax® 1657, 1074, 5513, 2533, 3000, 4033, 4011, and 1041 etc. from Arkema, Inc. In some embodiments, the poly(ether-b-amide) block copolymer is chosen from Pebax® 1657, which comprises a ratio of hard to soft segments of 40:60, or Pebax® 2533, which comprises a ratio of hard to soft segments of 20:80.

In one or more embodiments, the gas separation membrane includes 0.1 to 50 wt. % of the diisocyanate polyether according to formula (I). In some embodiments, the gas separation membrane includes from 0.5 to 30 wt. %, 0.5 to 20 wt. %, or from 1.0 to 10 wt. % of the diisocyanate polyether according to formula (I).

The degree of crosslinking may be determined by the gel content or gel %. In one or more embodiments, the degree of crosslinking in the gas separation membrane may be 0.1% to 5.0% or 0.5 to 2.5%.

In one or more embodiments, the gas separation membrane has a thickness of from 10 micrometers (μm) to 100 μm. In other embodiments, the gas separation membrane has a thickness of from 20 μm to 80 μm, 40 μm to 60 μm, or 30 μm to 70 μm.

One or embodiments of this disclosure include fabricating the gas separation membrane via a post crosslinking method. The post crosslinking method may include dissolving a poly(ether-b-amide) (PEBA) copolymer in a solvent to form a polymer solution. Then, the polymer solution may be casted into a mold. The solvent may be then evaporated to form a film. The film may be submerged in a crosslinking solution, in which the crosslinking solution includes diisocyanate polyether according to formula (I) to form a crosslinked film. The cross linked film is then dried to form the gas separation membrane.

In one or more embodiments, PEBA is dissolved in a solvent and mixed at a temperature from 25° C. to 105° C. or from 25° C. to 80° C. The solvent may be a mixture of various solvents such as water; alcohol; dimethylformaldehyde (DMF); dimethylacetamide (DMAc); dimethyl sulfoxide (DMSO); and 1,4-dioxane. In one or more embodiments, the solvent is a mixture of water and alcohol. When the solvent in a mixture of water and alcohol, the water is deionized water and the alcohol may be chosen from ethanol, methanol, propanol, iso-propanol, butanol, or combinations thereof.

In one or more embodiments of the water and alcohol solvent mixture, the alcohol is ethanol. In some embodiments of the water and alcohol solvent mixture, the alcohol to water ratio by volume may be from 60/40 to 80/20 (volume/volume). In other embodiments, the volume of water is from 65% to 75%, and the volume of alcohol is from 25% to 35%. In one or more embodiments, the solvent is approximately 70/30 (volume/volume) ethanol to deionized water.

The polymer solution that includes the dissolved PEBA is casted into a mold to form a film. The film is dried for 12 to 48 hours at 30° C. to 60° C. The film is removed from the mold and submerged into a crosslinking solution. In one or more embodiments, the crosslinking solution comprises from 1 to 50 weight percent of the diisocyanate polyether according to formula (I), based on the weight of the crosslinking solution. In some embodiments, the crosslinking solution contains from 4 to 16 wt. % or from 4 to 12 wt. % of the diisocyanate polyether. The degree of crosslinking depends on the time in which the film is submerged in the crosslinking solution and the concentration of the crosslinking solution. When the concentration is greater or the time the film is submerged is longer, the degree of crosslinking will be greater. In one or more embodiments, the film may be submerged in the crosslinking solution from 5 to 160 minutes. All individual time increments are included within this range. In some embodiments, the film is submerged for 5, 10, 15, 20, 40, 60, 80, or 120 minutes. The temperature of the crosslinking solution may be from 35 to 50° C.

In one or more embodiments, the gas separation membrane is fabricated via a solution method. The solution methods include dissolving PEBA and an amount of a diisocyante polyether according to formula (I) in a solvent to form a polymer crosslinking solution. The polymer crosslinking solution is cast into a mold and the solvent is evaporated to form a crosslinked film. The crosslinked film is dried to form the gas separation membrane. In one or more embodiments, the amount of diisocyanate polyether according to formula (I) is of from 1 wt. % to 50 wt. % based on the weight of the PEBA. In some embodiments, amount of diisocyanate polyether according to formula (I) is 2 wt. %, 3 wt. %, 4 wt. %, 5 wt. %, 6 wt. %, 7 wt. %, 8 wt. %, 9 wt.

%, 10 wt. %, 11 wt. %, 12 wt. %, 13 wt. %, 14 wt. %, 15 wt. %, or 16 wt. % based on the weight of the PEBA.

In some embodiments of the solution method, the solvent may be previously described solvents used in the post crosslinking method.

In one or more embodiments of the solution method, the polymer crosslinking solution is heated or refluxed at temperatures 50° C. to 130° C. In some embodiments, the polymer crosslinking solution was mixed for at least 2 hours at 85° C. The crosslinking solution contains from 2 to 60 wt. % of the diisocyanate polyether based on the weight of PEBA.

After the crosslinked film is formed either by the solution method of the post crosslinking method, the crosslinked film is dried. In one or more embodiments, the crosslinked film is dried at a temperature of from 35 to 50° C. The crosslinked film may be dried under reduced pressure for 12 to 60 hours to form the gas separation membrane.

Once the gas separation membrane is formed, it yields good gas separation selectivity, greater mechanical strength than the neat PEBA copolymer, and greater resistance to swelling and improved plasticization resistance than the neat PEBA copolymer. The gas separation membrane is capable of separating gas mixtures having sour components. Sour gas is natural gas or any other gas containing significant amounts of carbon dioxide ($CO_2$) or hydrogen sulfide ($H_2S$). Natural gas is usually considered sour if there is more than 5.7 milligrams of $H_2S$ per cubic meter of natural gas, which is equivalent to approximately 4 parts per million (ppm) by volume under standard temperature and pressure. Natural gas may include: methane, ethane, propane and heavier hydrocarbons; nitrogen gas, carbon dioxide and trace amounts of water.

In one or more embodiments, methods of gas separation include flowing a gas stream through a gas separation membrane, the gas separation membrane comprising a PEBA copolymer crosslinked by a structure according to formula (I): and separating the gases via the gas separation membrane.

In some embodiments, the gas separation membrane achieves an increase in mechanical tensile stress of greater than 100% when compared to uncrosslinked poly(ether-b-amide) copolymer.

In one or more embodiments, the gas separation membrane of this disclosure is prepared at a low temperature (less than 85° C.); the crosslinking reaction occurs at a fast rate having a reaction time of approximately 5 to 120 minutes without a catalyst or catalytic activator; and the overall mechanical properties are comparatively better than the neat PEBA membrane. The combination of these features provides an easily prepared gas separation membrane that effectively separates $CO_2$ and methane gases.

EXAMPLES

Comparative Membrane: Example C1

Preparation of Poly(amide-/β-ether) Membrane (Pebax®1657)

Pebax® 1657 was dried in a vacuum oven at 60° C. for 24 hours. A sample of 0.8 g of dried Pebax® 1657 was dissolved in a mixture of 20 mL ethanol/deionized (DI) water (70/30 v/v). The reaction mixture was vigorously stirred at 85° C. under reflux for at least 6 hour to obtain a homogenous solution.

The obtained Pebax mixture was placed at 50-60° C. to remove gas bubbles and then was poured into a pre-heated (50 to 60° C.) flat-bottomed Petri dish containing polytetrafluoroethylene (PTFE) to prepare the dense film. The dense film was dried at room temperature overnight with a cover for slow solvent evaporation, and then dried in a vacuum oven at 40-60° C. for 48 hours. Subsequently, the membranes were easily peeled off the Petri dishes for permeation testing. The membrane $CO_2$ permeability and $CO_2/CH_4$ idea selectivity is 60.6 Barrer and 23.2 at 100 psi, respectively.

Comparative Membrane: Example C2

Preparation of Poly(amide-/β-ether) Membrane (Pebax 2533)

Pebax® 2533 was dried in a vacuum oven at 60° C. for 24 hours. A sample of 0.8 g of dried Pebax® 2533 was dissolved in 20 mL 1-butanol. The reaction mixture was vigorously stirred at 105° C. for at least 6 hour to obtain a homogeneous solution.

The obtained Pebax solution was placed at 60-90° C. to remove gas bubbles and then was poured into a pre-heated (60-90° C.) flat-bottomed Petri dish containing polytetrafluoroethylene (PTFE) to prepare the dense film. The dense film was dried at 50° C. overnight with a cover for slow solvent evaporation, and then dried in a vacuum oven at 90° C. for 48 hours. Subsequently, the membranes were easily peeled off the Petri dishes for permeation testing. The membrane $CO_2$ permeability and $CO_2/CH_4$ idea selectivity is 187.2 Barrer and 8.3 at 100 psi, respectively.

Post Crosslinking: Example 1

Preparation of a Crosslinked poly(ether-b-amide) Copolymer—Crosslinked Membrane

Polymer Solution Preparation:

Pebax® membrane materials (e.g. Pebax®1657) were dried in a vacuum oven at 60° C. for 24 hours. Then, a Pebax®1657 solution was prepared by adding 0.8 grams of dried Pebax®1657 to a solvent mixture of 20 mL (4 wt. %) ethanol/deionized (DI) water (70/30 v/v). The reaction mixture was vigorously stirred at 85° C. under reflux for at least 6 hour to obtain a homogenous solution.

Dense Film Membrane Formation:

A solution casting method was used to prepare the dense film after gas bubbles were removed from the above prepared polymer solution. The dense film was dried at room temperature overnight to fully evaporate the solvent. Then the film was moved to a vacuum oven for further drying at 40-60° C. and 1 torr for 48 hours. The average thickness of the dense film was 30 to 70 μm.

Crosslinking Solution Preparation:

This crosslinking solution was prepared in toluene at room temperature with a concentration of 1-50 wt % of (propylene glycol)-tolylene diisocyanate (PPGDI) (molecular weight: 2300). To 50 mL of toluene, 8.0 grams of PPGDI was added to form a crosslinking solution (the different amounts of crosslinking solution are shown in Table 1.

TABLE 1

Amounts of PPGDI in the Crosslinking Solution

| PPGDI concentration | | Toluene |
|---|---|---|
| 4% | 2.0 g | 50 mL |
| 16% | 8.0 g | 50 mL |
| 32% | 16.0 g | 50 mL |

Crosslinked Membrane:

Crosslinking of Pebax® membrane was carried out by immersing the above prepared dense membrane in a 4 to 32 wt % solution of PPGDI in toluene at ambient to 60° C. for 5 to 120 minutes. The membranes were removed from PPGDI solution at appropriate time and washed thoroughly in toluene and DI water to remove the PPGDI residue. The membranes were dried at room temperature overnight, and then dried in a vacuum oven at 40° C. and 1 torr for 48 hours. The average thickness of the crosslinked membranes were 30 to 70 μm. The crosslinked membranes retained its transparency with the following formula. The degree of crosslinking in these high plasticization-resistance chemically crosslinked polymeric membranes as described in this disclosure can be controlled by increasing or decreasing the crosslinking time or by adjusting the weight ratio of the polymeric membrane materials to the crosslinking agent as shown in Table 2.

TABLE 2

Gel Percent Increased as Concentration of PPGDI Increased

| PPGDI concentration | Treatment time | Gel percent |
|---|---|---|
| 4% | 10 min | 0.37% |
| 16% | 30 min | 0.51% |
| 16% | 60 min | 0.52% |
| 32% | 30 min | 0.88% |

Solution Method: Example 2

Preparation of a Crosslinked poly(ether-b-amide) Copolymer—Crosslinked Membrane

Pebax® 1657 resin was dried in a vacuum oven at 60° C. for 24 hours. 0.8 grams (g) of Pebax® 1657 was dissolved in 20 mL DMF. The reaction mixture was vigorously stirred at 115° C. under reflux for at least 6 hour to obtain a homogeneous solution. 0.128 g of PPGDI (16 wt % based on the weight of Pebax) was added to the Pebax solution, and the solution was mixed for at least 2 hours at 85° C. The solution was poured within pre-heated (85° C.) polytetrafluoroethylene (PTFE) flat-bottomed Petri dishes and the solvent was evaporated at 70° C. overnight with a cover for solvent evaporation, and then dried in a vacuum oven at 90° C. for 48 hours. The membrane $CO_2$ permeability and $CO_2/CH_4$ idea selectivity is 115.3 Barrer and 20.4 at 100 psi, respectively.

Solution Method: Example 3

Preparation of a Crosslinked poly(ether-b-amide) Copolymer—Crosslinked Membrane

Pebax® 1657 resin was dried in a vacuum oven at 60° C. for 24 hours. 0.8 grams (g) of Pebax® 1657 was dissolved in 20 mL of N,N-dimethyl acetimide (DMAc). The reaction mixture was vigorously stirred at 115° C. under reflux for at least 6 hour to obtain a homogeneous solution. To the polymer solution, 0.160 g of PPGDI (20 wt % based on the weight of Pebax) was added to form the crosslinking solution, and the crosslinking solution was mixed for at least 2 hours at 85° C. The solution was poured within pre-heated (85° C.) polytetrafluoroethylene (PTFE) flat-bottomed Petri dishes and the solvent was evaporated at 70° C. overnight with a cover for solvent evaporation. The resulting crosslinked Pebax/PPGDI membrane, crosslinked membrane, was detached from the PFTE Petri dishes, and then dried in a vacuum oven at 60° C. and 90° C. for 48 hours or 24 hours. Table 3 showed that the concentration of PPGDI affected the gel percent of crosslinked Pebax® 1657 membranes. The crosslinked membrane had a $CO_2$ permeability that was 133.9 Barrer and $CO_2/CH_4$ idea selectivity was 18.8 at 100 psi.

TABLE 3

Gel Percent Increases as the PPGDI Weight Percent Increases in the Solution Method

| PPGDI wt. % (based on the weight of Pebax) | Gel % |
|---|---|
| 5% | 0.66% |
| 10% | 0.92% |
| 20% | 1.28% |
| 40% | 2.46% |

Solution Method: Example 4

Preparation of a Crosslinked poly(ether-b-amide) Copolymer—Crosslinked Membrane

Pebax® 2533 resin was dried in a vacuum oven at 60° C. for 24 hours. 0.8 g of Pebax® 1657 was dissolved in 20 mL of 1,4-Dioxane. The reaction mixture was vigorously stirred at 105° C. under reflux for at least 6 hour to obtain a homogeneous solution. To the polymer solution, 0.160 g of PPGDI (20 wt % based on the weight of Pebax) was added to form the crosslinking solution, and the crosslinking solution was mixed for at least 2 hours at 85° C. The solution was poured within pre-heated (90° C.) polytetrafluoroethylene (PTFE) flat-bottomed Petri dishes and the solvent was evaporated at 50° C. overnight with a cover for solvent evaporation. The resulting crosslinked Pebax/PPGDI membrane, crosslinked membrane, was detached from the PFTE Petri dishes, and then dried in a vacuum oven at 60° C. and 90° C. for 48 hours and 24 hours. The crosslinked membrane had a $CO_2$ permeability that was 188.6 Barrer. and $CO_2/CH_4$ idea selectivity that was 9.75 at 100 psi.

Studies

The two membranes, the Comparative Membrane as prepared in Example C1 and C2 and the crosslinked membranes as prepared in Examples 1, 2, 3, and 4 were studied. The formation of the crosslinked membrane of Example 1 was characterized by Fourier Transform Infrared—Attenuated Total Reflection (FTIR-ATR) spectroscopy. The formation of the urethane links between the Pebax, a poly(ether-b-amide) copolymer, and the diisocyanate polyether, PPGDI, was confirmed by FTIR. In FIG. 1, the stack spectra of the crosslinked membrane and the Comparative Membrane C1, there was a vibration band at about 1563 $cm^{-1}$ corresponding to a carboxylic amide (—NH—CO) group in the crosslinked membrane spectrum that was not present in the Comparative Membrane. The presence of the vibration band at 1563 cm$^{-1}$ indicated that urethane links formed.

Figure 2:
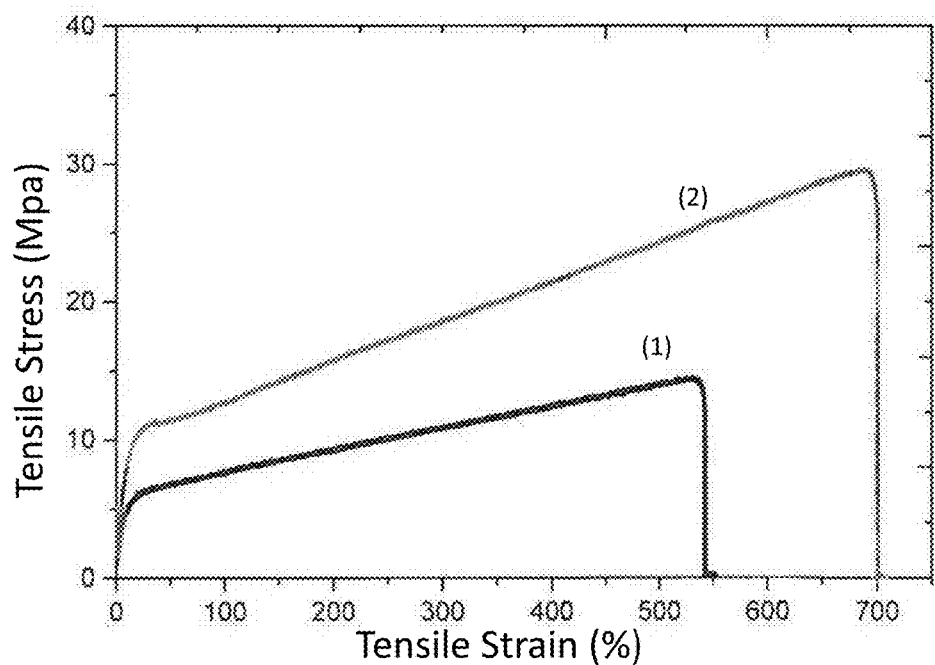
FIG. 2 is a graph of tensile stress-strain curves, Tensile Stress in MPa versus Tensile Strain (%), of uncrosslinked Pebax® (1) and crosslinked Pebax® with diisocyanate polyether (2).
Figure 3:
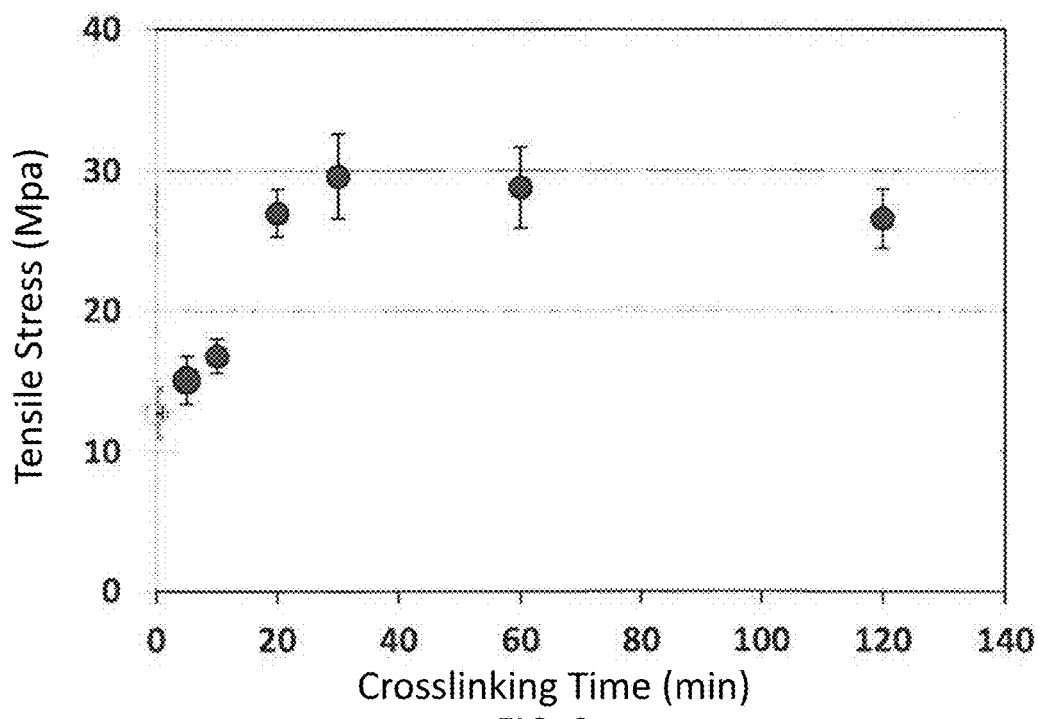
FIG. 3 is a graph of membrane tensile stress in mega Pascals (MPa) versus the crosslinking time in minutes. The studies of the crosslinking reaction and Instron testing are performed at 25° C.
Figure 4:
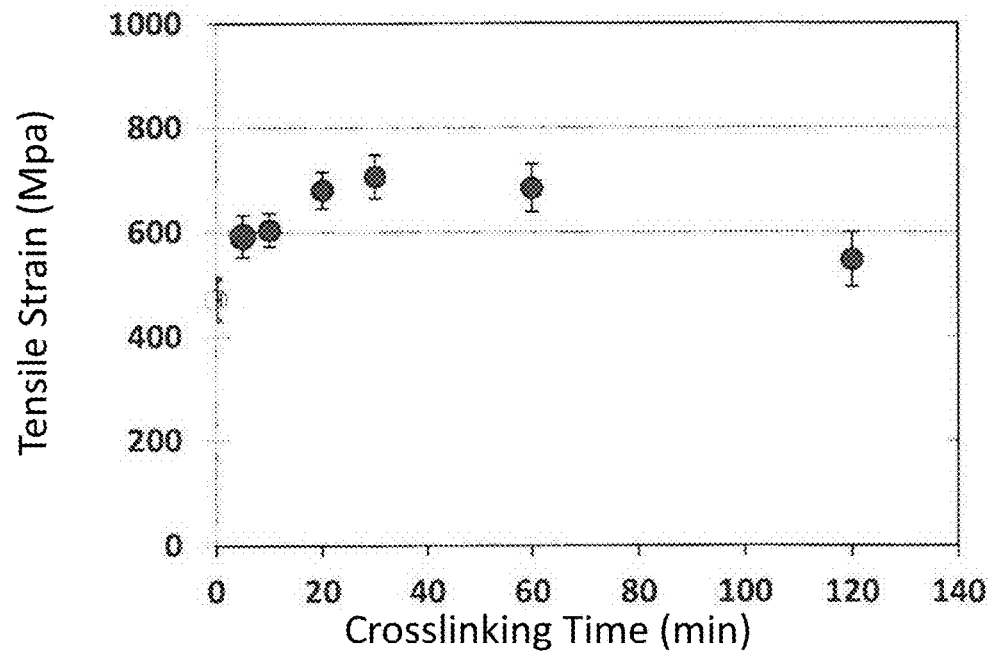
FIG. 4 is a graph of membrane tensile strain (elongation) in MPa versus the crosslinking time in minutes. The studies of crosslinking reaction and Instron testing are performed at 25° C.

The mechanical properties of the membranes (such as the tensile strength and elongation) were characterized by an Universal Instron device. The stress-strain curves were plotted and shown in FIG. 2. The results of the stress-strain curves demonstrated that the crosslinked membrane had a significant increase in tensile stress and tensile stain than the Comparative Membrane C1. The increase in tensile stress and tensile strain was attributed to the formation of an interconnected network through urethane linkages in the Pebax matrix of the crosslinked membrane. As further evidence, the crosslinking time affected the mechanical properties of the crosslinked membrane. Thus, the mechanical properties can be controlled by the amount of time the dense film is submerged in the crosslinking solution. In FIGS. 3 and 4, the crosslinked membrane demonstrated a significant improvement in tensile stress, having about a 135% increase after 30 minutes of crosslinking time as compared to Comparative Membrane C1. In FIGS. 3 and 4, the results of the crosslinked membrane were marked by solid circles; and the results of the Comparative Membrane C1 were marked by unfilled circles at 0 minutes in FIGS. 3 and 4.

Figure 5:
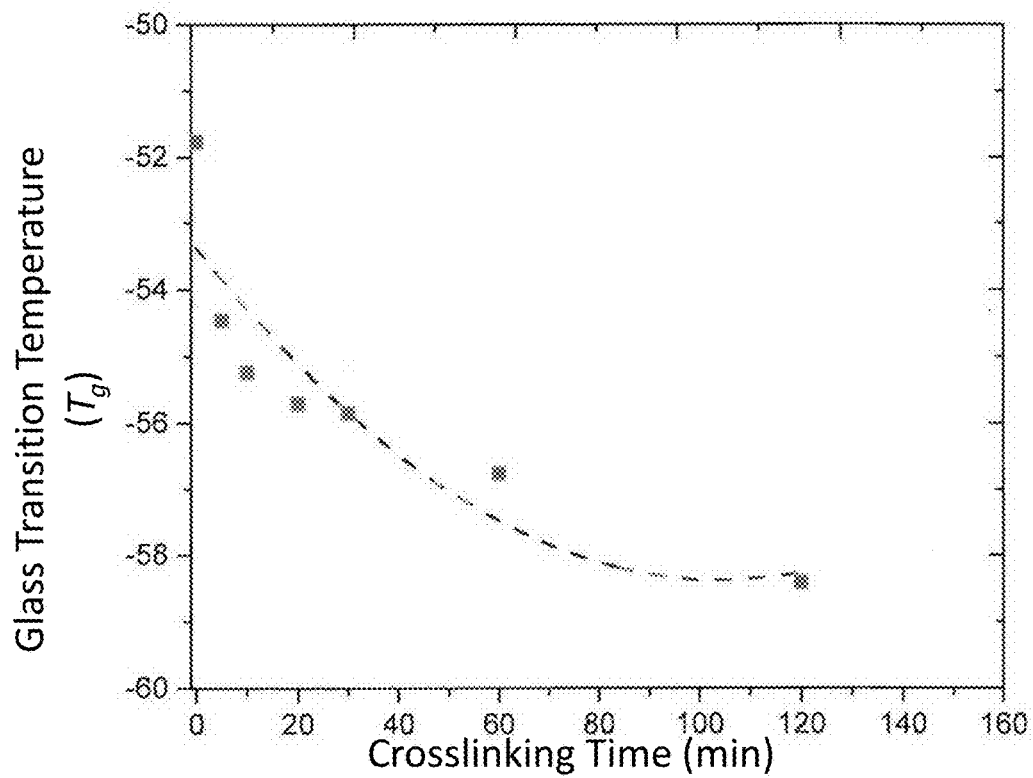
FIG. 5 is a graph of the glass transition temperature ($T_g$) in degree Celsius of the crosslinked Pebax® membranes versus the crosslinking time in minutes.

The thermal properties of the membranes were characterized by Differential scanning calorimetry (DSC). In FIG. 5, the glass transition temperature decreased with increasing of crosslinking time, indicating that the more flexible propylene glycol segments were introduced into the Pebax matrix of the crosslinked membrane via a urethane linkage. Additionally, the overall melting point of the crosslinked membrane was affected as well as segments of the membrane. For example, the melting point of the polyether soft blocks (the PEG segments) in the Pebax block copolymer of the crosslinked membrane decreased from 11° C. to 8° C., while the melting point of the hard blocks (the polyamide segments) remained the same, indicating that the polyethylene repeating units of the PPGDI are likely interconnected with the polyether soft block of the Pebax, resulting in a decrease in crystallinity.

Figure 6:
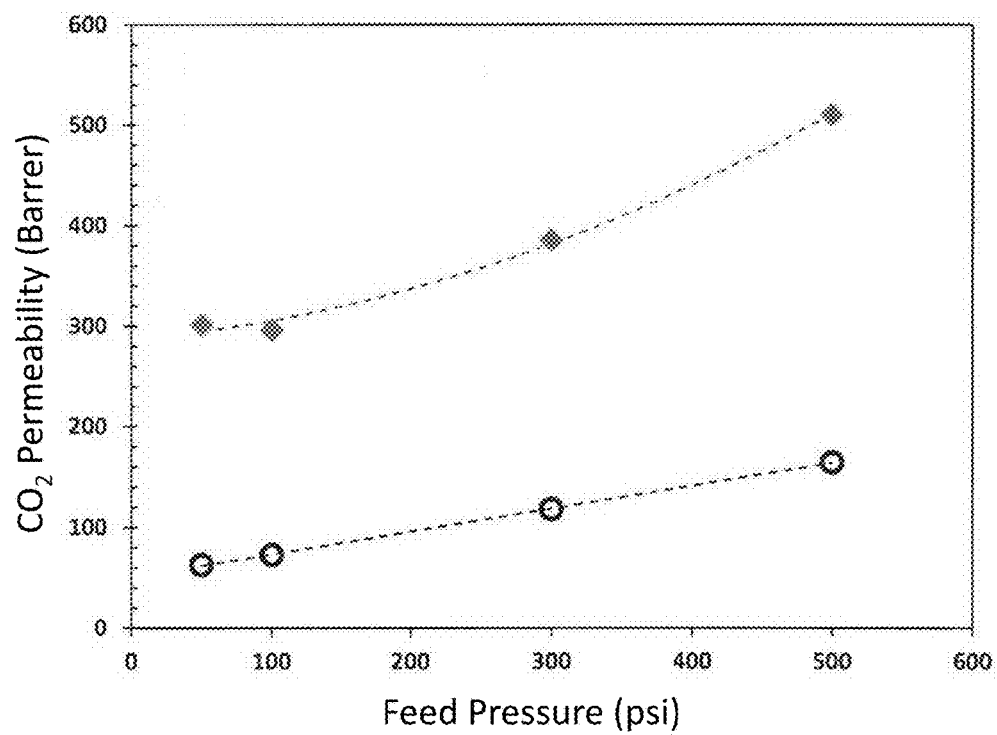
FIG. 6 is a graph of $CO_2$ permeability (in Barrer) versus the feed pressure at 50 to 500 psi (pounds per square inch), in which the unfilled circles represent data points for the uncrosslinked Pebax® membrane and the filled diamonds represent data points for the crosslinked membrane.

The permeability of $CO_2$ and $CH_4$ ($P_{CO_2}$ and $P_{CH_4}$) and ideal selectivity for $CO_2/CH_4$ ($\alpha CO_2/CH_4$) of Comparative Membrane C1 and crosslinked membranes were measured by pure gas measurements at 25° C. under 500 psig single gas pressure. The results are shown in FIG. 6. It has been demonstrated from pure gas permeation results that the crosslinked membrane exhibited a significant improvement (400%) in $CO_2$ permeability compared to uncrosslinked Comparative Membrane C1, this is due to high affinity of $CO_2$ molecules with propylene glycol segment in Pebax matrix.

The results of the $CO_2$ permeability and $CO_2/CH_4$ selectivity of: the crosslinked membranes, including membranes formed by the post-treatment (Example 1) and solution treatment (Examples 2, 3, and 4) and neat Pebax membranes, including the Comparative Example C1, C2, and literature values, were recorded in Table 4. In Table 4, some of the literature values included different testing conditions, which prevented a direct comparison. The Sridhar crosslinked membrane consisted of Pebax® 1657 and 2,4-toluylene diisocyanate (TDI). The Peinemann membranes included Pebax® 1657 and polyethylene glycol—dimethyl ethers (PEG-DME) blended membranes with increasing amounts of PEG-DME.

TABLE 4

Permeability and Selectivity for Various Membranes

| Method Preparation | Sample # | PPGDI % | Solvent | Time | $P_{CO2}$ (Barrer) | $\alpha_{CO2/CH4}$ | Feed pressure |
|---|---|---|---|---|---|---|---|
| Example C1-C2 | Comparative Membrane C1 | | no treatment | | 60.59 | 23.21 | 100 psi |
| | Comparative Membrane C2 | | no treatment | | 187.17 | 8.34 | 100 psi |
| Post-treatment Method Example 1 | Crosslinked Membrane 1 | 4% | Toluene | 30 min | 105.53 | 21.06 | 100 psi |
| | Crosslinked Membrane 2 | 16% | Toluene | 20 min | 93.55 | 24.65 | 100 psi |
| | Crosslinked Membrane 3 | 16% | Toluene | 30 min | 296.01 | 19.27 | 100 psi |
| | Crosslinked Membrane 4 | 16% | Toluene | 60 min | 109.70 | 26.60 | 100 psi |
| Solution Method Example 2-4 | Crosslinked Membrane 6 | 5%- | DMSO | 2 hr | 129.61 | 19.91 | 100 psi |
| | Crosslinked Membrane 7 | 20% | DMAc | 2 hr | 133.93 | 18.75 | 100 psi |
| | Crosslinked Membrane 8 | 16% | DMF | 2 hr | 115.30 | 20.44 | 100 psi |
| | Crosslinked Membrane 9 | 20% | 1,4-Dioxane | 2 hr | 188.64 | 9.75 | 100 psi |
| | Crosslinked Membrane 10 | 30% | 1,4-Dioxane | 2 hr | 174.39 | 9.66 | 100 psi |
| Sridhar* | Pebax 1657 | | no treatment | | 3.1 | 17.8 | 142 psi |
| | | | | | 3.7 | 21.2 | 286 psi |
| | | | | | 4.8 | 24.8 | 569 psi |
| | Crosslinked Pebax 1657 | 2% TDI | Hexane | 5 min | 0.6 | 37.6 | 142 psi |
| | | | | | 0.75 | 43.1 | 286 psi |
| | | | | | 0.9 | 46.7 | 569 psi |

TABLE 4-continued

Permeability and Selectivity for Various Membranes

| Method Preparation | Sample # | Treatment conditions PPGDI % | Solvent | Time | $P_{CO2}$ (Barrer) | $\alpha_{CO2/CH4}$ | Feed pressure |
|---|---|---|---|---|---|---|---|
| Peinemann* | Pebax 1657 | no treatment | | | 78 | 15.6 | — |
| | Pebax 1657/ PEG-DME10 | 10% PEG-DME blending | | | 123 | 15.6 | — |
| | Pebax 1657/ PEG-DME20 | 20% PEG-DME blending | | | 206 | 14.7 | — |
| | Pebax 1657/ PEG-DME40 | 40% PEG-DME blending | | | 440 | 13.8 | — |

The results in Table 4 indicated that the crosslinked membranes demonstrated an improved $CO_2$ permeability, improved or comparable $CO_2/CH_4$ selectivity as compared to the Comparative Membranes C1 and C2. The Peinemann membranes described in Table 4 showed a decrease in $CO_2/CH_4$ selectivity as compared to the crosslinked membranes.

*Values found in literature: S. Sridhar et al. "Development of Crosslinked poly(ether-block-amide) Membrane for $CO_2/CH_4$ Separation." Colloids and Surfaces A: Physiochem. Eng. Aspects 297 (2007) 267-274; Peinemann et al. "Polymer Membrane" U.S. Pat. No. 8,317,900 B2, filed Dec. 22, 2010.

mance would be in the upper right hand corner. The results indicated that the crosslinked Pebax® 1657 membranes with 16% PPGDI (solid circle) exhibited a significant increase of approximately 400% in $CO_2$ permeability and a comparable increase in $CO_2/CH_4$ selectivity, as compared to Comparative Membrane C1 (unfilled squares), and Pebax membrane crosslinked with TDI (as marked by the unfilled triangle). The increase in $CO_2$ permeability was attributed to the high $CO_2$ affinity with the incorporated polyether segments in the crosslinked membrane.

TABLE 5

Permeability and Selectivity for Various Membranes at Different Feed Pressures

| Method preparation | PPGDI concentration | $P_{CO2}$ (Barrer) | | | | $\alpha_{CO2/CH4}$ | | | |
|---|---|---|---|---|---|---|---|---|---|
| | | 50 psi | 100 psi | 300 psi | 500 psi | 50 psi | 100 psi | 300 psi | 500 psi |
| Example C1 | 0 | 62.82 | 73.00 | 118.19 | 164.32 | 20.95 | 24.25 | 36.85 | 47.46 |
| Post-treatment Method | 4% | 97.03 | 105.53 | 139.53 | 173.53 | 19.00 | 21.06 | 29.31 | 37.54 |
| Post-treatment Method | 16% | 301.46 | 296.01 | 385.76 | 510.19 | 19.17 | 19.27 | 28.43 | 41.76 |
| Solution Method | 5% | 114.58 | 129.61 | 196.06 | 287.99 | 18.54 | 19.91 | 30.01 | 44.64 |

Figure 7:
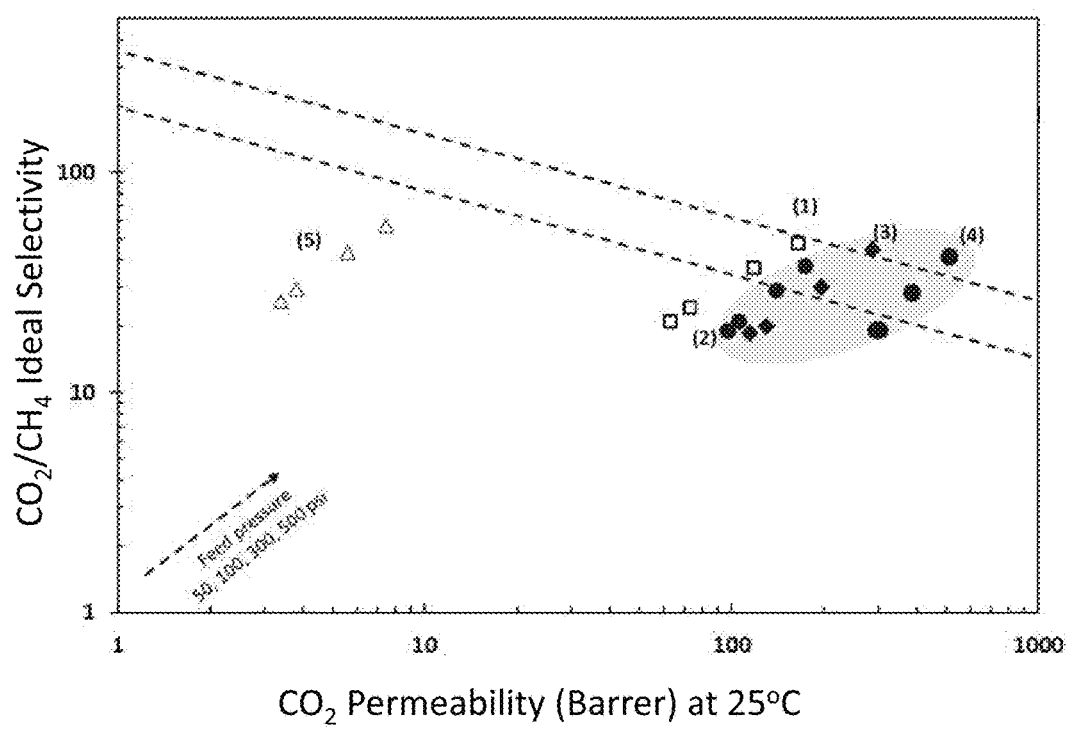
FIG. 7 is a graph of $CO_2/CH_4$ Ideal Selectivity versus $CO_2$ permeability in Barrer tested at 25° C. and feed pressure from 50 to 500 psi for: (1) Neat Pebax® membrane (represented by unfilled squares); (2) and (4) crosslinked membranes prepared by post treatment with (propylene glycol)-tolylene diisocyanate (PPGDI) (represented by filled circles), with (2) representing a 4% PPGDI and (4) representing 16% PPGDI; (3) crosslinked membrane prepared by solution treatment with PPGDI (represented by filled squares); (5) crosslinked membranes prepared by post treatment with 2,4-toluylene diisocyanate (TDI) (represented by unfilled triangles).
Figure 8:
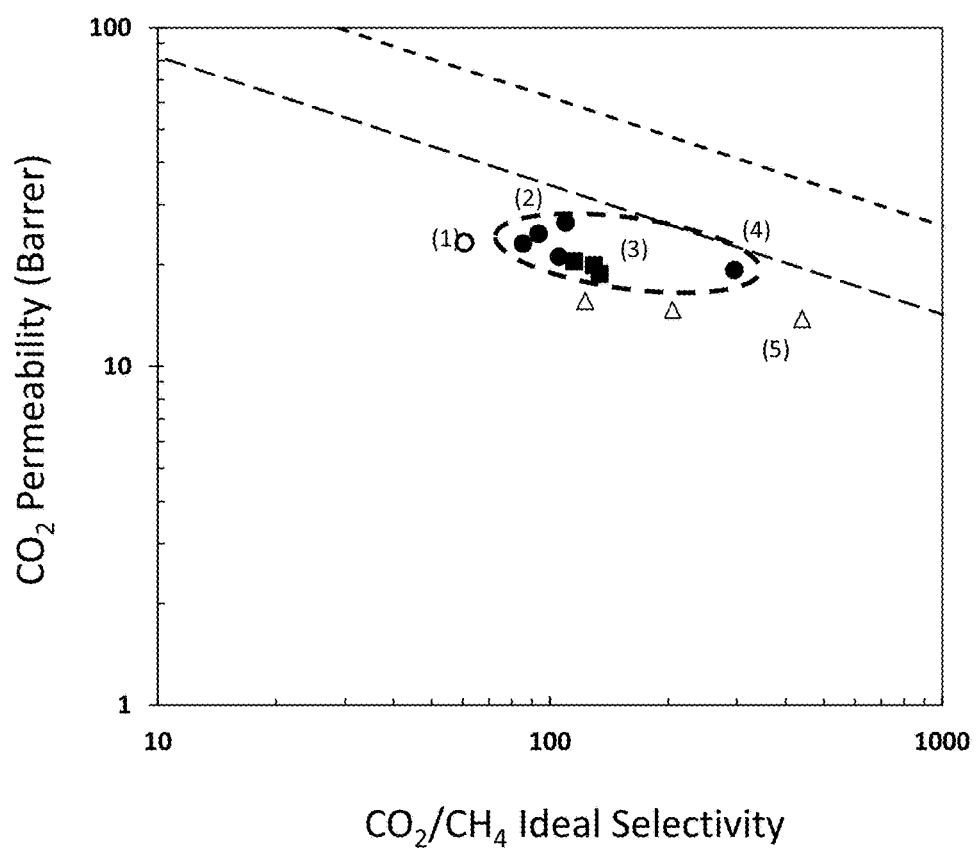
FIG. 8 is a graph of $CO_2$ permeability versus $CO_2/CH_4$ ideal selectivity for crosslinked Pebax® membranes (filled circles and squares designated by (2), (3), and (4)) and uncrosslinked Pebax® membranes (unfilled circle designated by (1)) tested at 25° C. and feed pressure of 100 psi; and crosslinked membrane prepared by Peinemann as a comparative literature study (unfilled triangle—(5)). The top dash line is 2008 Roberson trade-off line; bottom dash line is 1991 Roberson trade-off line.

In FIG. 7, the effects of the concentration of the crosslinker, PPGDI, (μmounts from 4 wt. % to 16 wt. %) (See Table 5) on the membrane permeation performance indicated that the crosslinked membrane showed significantly improved $CO_2$ permeability and comparable $CO_2/CH_4$ selectivity compared to the Comparative Membrane C1 at 25° C. under 500 psig. In FIG. 7, the unfilled squares and (1) represented the Comparative Membrane C1; solid circles and (2) represented a post-crosslinked membrane with 4% PPGDI; solid circle and (4) represents Pebax membrane post-crosslinked with 16% PPGDI; the solid square and (3) represents Pebax polymer post-crosslinked with 5% PPGDI in DMSO solvent; the solid triangles and (5) represents Pebax membrane post-crosslinked with 4% toluene diisocyanate (TDI); bottom black dash line represents 2008 and top black dash line represents 1991 Roberson trade-off lines. The Roberson trade-off line represents recognized relationship between permeability and selectivity. Generally, polymers that are more permeable are less selective and polymers that are more selective are less permeable. The Roberson trade-off line defines the "upper bound" combination of permeability and selectivity of known polymers membrane materials for this particular gas pair ($O_2/N_2$, $CO_2/CH_4$, $H_2/N_2$, etc.). Membranes with the best perfor- In FIG. 8, the data points showed the results of $CO_2/CH_4$ Ideal Selectivity versus $CO_2$ permeability in Barrer tested at 100 psi and 25° C. for: (1) Neat Pebax® membrane (represented by unfilled circle); (2) crosslinked membrane prepared by post treatment, Example 1, (represented by filled circles); (3) crosslinked membrane prepared by solution treatment, Example 2, (represented by filled squares); (4) membranes prepared by Peinemann as a comparative literature study (represented by unfilled triangles).

Figure 9:
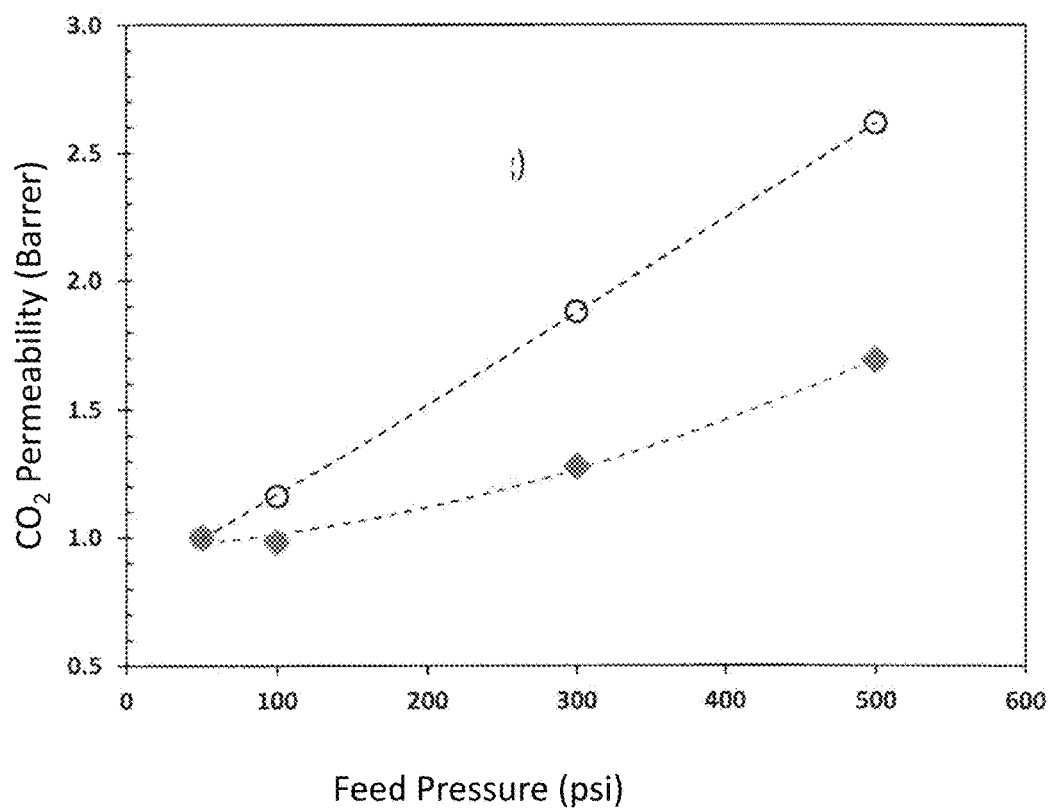
FIG. 9 is a graph of relative $CO_2$ permeability versus the feed pressure at 50 to 500 psi. The relative $CO_2$ permeability is equated to Permeability at given pressure/Permeability at 50 psi, in which the unfilled circles represent data points for the uncrosslinked Pebax® membrane and the filled diamonds represent data points for the crosslinked membrane.

To determine the effect the crosslinker PPGDI had on the plasticization resistance of crosslinked membranes as compared to the Comparative Membrane C1, both membranes were conditioned with $CO_2$ at different pressures from 50 to 500 psi. The change of $CO_2$ relative permeability ($Pp/P_{50psi}$) with the increase of the applied $CO_2$ pressure at 25° C. was studied and the results were recorded in FIG. 9. The results indicated that the uncrosslinked Comparative Membrane C1 (unfilled circles) exhibited 88% and 160% increase in $CO_2$ permeability under the feed pressure of 300 psi and 500 psi compared to the permeability under the $CO_2$ feed pressure of 50 psi. The significant increase in $CO_2$ permeability at higher $CO_2$ feed pressure was due to the $CO_2$ plasticization (or swelling) of the Comparative Membrane C1. However, the crosslinked membrane (filled diamonds) exhibited about 44% and 70% increase in $CO_2$ permeability at $CO_2$ feed pressure of 300 psi and 500 psi compared to that under 50 psi. This indicated that the crosslinked membrane demonstrated a significant improvement in $CO_2$ plasticization resistance as compared to uncrosslinked Comparative Membrane C1. These results were attributed to the chemical crosslinking and formation of rigid crosslinked networks via urethane linkages.

The subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

Unless otherwise defined, all technical and scientific terms used in this disclosure have the same meaning as commonly understood by one of ordinary skill in the art. The terminology used in the description is for describing particular embodiments only and is not intended to be limiting. As used in the specification and appended claims, the singular forms "a," "an," and "the" are intended to include the plural forms as well, unless the context clearly indicates otherwise.

It will be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

The invention claimed is:

1. A method of making a gas separation membrane comprising:
   dissolving a poly(ether-b-amide) (PEBA) copolymer in a solvent to form a polymer solution;
   casting the polymer solution into a mold;
   evaporating the solvent to form a film;
   submerging the film in a crosslinking solution to form a crosslinked film, wherein the crosslinking solution comprises a diisocyanate polyether according to formula (I):

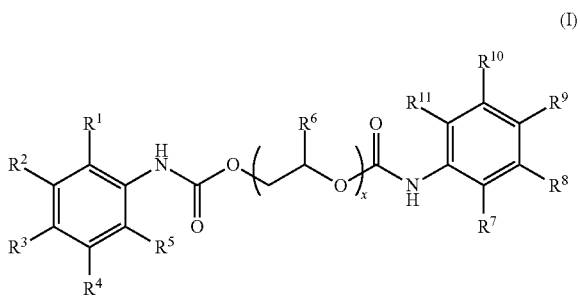

(I)

where
   $R^6$ is independently an alkyl or —H;
   x is from 1 to 200; and
   $R^1$, $R^2$, $R^3$, $R^4$, $R^5$, $R^7$, $R^8$, $R^9$, $R^{10}$, and $R^{11}$ is independently —C=N=O, alkyl or —H, provided that at least one and not more than two of $R^1$, $R^2$, $R^3$, $R^4$ and $R^5$ is —C=N=O and at least one and not more than two of $R^7$, $R^8$, $R^9$, $R^{10}$, and $R^{11}$ is independently —C=N=O; and
drying the film to form the gas separation membrane.

2. The method of making a gas separation membrane of claim 1, in which the poly(ether-b-amide) copolymer comprises a 25 to 80% by weight polyether segment and a 75 to 20% by weight polyamide segment.

3. The method of making a gas separation membrane of claim 1, in which $R^6$ is methyl or —H.

4. The method of making a gas separation membrane of claim 1, in which $R^4$ and $R^8$ are —C=N=O; and $R^3$ and $R^9$ are methyl.

5. The method of making a gas separation membrane of claim 1, in which the polymer solution comprises 1 to 99 weight percent of poly(ether-b-amide) copolymer.

6. The method of making a gas separation membrane of claim 1, in which the crosslinking solution comprises 2 to 40 weight percent of the crosslinker according to formula (I).

7. The method of making a gas separation membrane of claim 1, in which the crosslinking solution had a temperature of from 35 to 85° C.

8. The method of making a gas separation membrane of claim 1, in which the gas separation membrane was dried at a temperature of from 35 to 90° C.

9. A method of gas separation, the method comprising:
   flowing a gas stream through a gas separation membrane, the gas separation membrane comprising a polyether block amide (PEBA) crosslinked by a diisocyanate polyether according to formula (I):

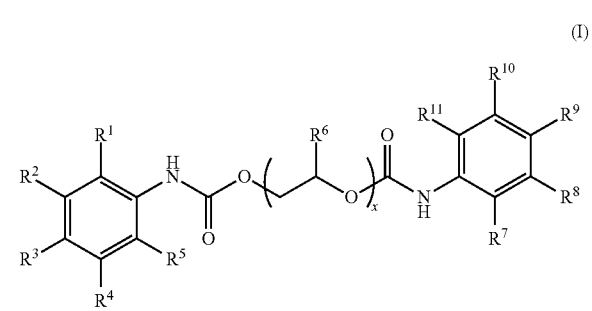

(I)

where
   each $R^6$ is independently an alkyl or —H;
   x is from 1 to 200; and
   $R^1$, $R^2$, $R^3$, $R^4$, $R^5$, $R^7$, $R^8$, $R^9$, $R^{10}$, and $R^{11}$ is independently —C=N=O, alkyl or —H, provided that at least one and not more than two of $R^1$, $R^2$, $R^3$, $R^4$ and $R^5$ is —C=N=O and at least one and not more than two of $R^7$, $R^8$, $R^9$, $R^{10}$, and $R^{11}$ is independently —C=N=O; and
separating the gases via the gas separation membrane.

10. A gas separation membrane comprising cross-linked poly(ether-b-amide) copolymer, in which the poly(ether-b-amide) copolymer comprise urethane crosslinks which is the reaction product of poly(ether-b-amide) copolymer and diisocyanate polyether according to formula (I):

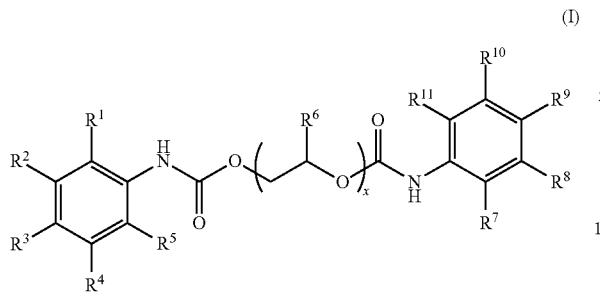
(I)

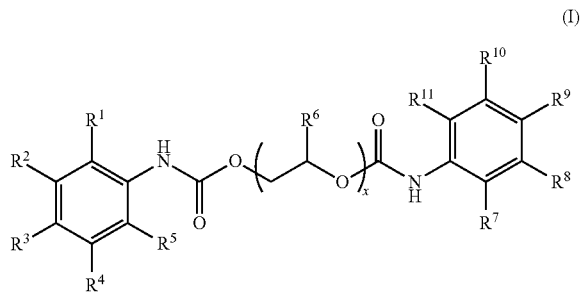
(I)

where
each $R^6$ is independently an alkyl or —H;
x is from 1 to 200; and
$R^1$, $R^2$, $R^3$, $R^4$, $R^5$, $R^7$, $R^8$, $R^9$, $R^{10}$, and $R^{11}$ is independently —C≡N≡O, alkyl or —H, provided that at least one and not more than two of $R^1$, $R^2$, $R^3$, $R^4$ and $R^5$ is —C≡N≡O and at least one and not more than two of $R^7$, $R^8$, $R^9$, $R^{10}$, and $R^{11}$ is independently —C≡N≡O.

11. The gas separation membrane according to claim 10, in which the gas separation membrane further comprises a thickness of from 30 to 70 micrometers (μm).

12. The gas separation membrane according to claim 10, in which $R^6$ is methyl or —H.

13. The gas separation membrane according to claim 10, in which $R^4$ and $R^8$ are —C≡N≡O; and $R^3$ and $R^9$ are methyl.

14. The gas separation membrane according to claim 10, in which the gas separation membrane further comprises 1 to 99% by weight of poly(ether-b-amide) copolymer.

15. The gas separation membrane according to claim 10, in which the gas separation membrane further comprises 2 to 40% by weight of the diisocyanate polyether according to formula (I).

16. A method of making a gas separation membrane comprising:
dissolving a poly(ether-b-amide) (PEBA) copolymer and an amount of a diisocyanate polyether according to formula (I) in a solvent to form a polymer crosslinking solution;

where
$R^6$ is independently an alkyl or —H;
x is from 1 to 200; and
$R^1$, $R^2$, $R^3$, $R^4$, $R^5$, $R^7$, $R^8$, $R^9$, $R^{10}$, and $R^{11}$ is independently —C≡N≡O, alkyl or —H, provided that at least one and not more than two of $R^1$, $R^2$, $R^3$, $R^4$ and $R^5$ is —C≡N≡O and at least one and not more than two of $R^7$, $R^8$, $R^9$, $R^{10}$, and $R^{11}$ is independently —C≡N≡O; and
casting the polymer crosslinking solution into a mold;
evaporating the solvent to form a crosslinked film;
drying the film to form the gas separation membrane.

17. The method of making a gas separation membrane of claim 16, in which the poly(ether-b-amide) copolymer comprises a 25 to 80% by weight polyether segment and a 75 to 20% by weight polyamide segment.

18. The method of making a gas separation membrane of claim 16, in which $R^6$ is methyl or —H.

19. The method of making a gas separation membrane of claim 16, in which $R^4$ and $R^8$ are —C≡N≡O; and $R^3$ and $R^9$ are methyl.

20. The method of making a gas separation membrane of claim 16, in which the polymer crosslinking solution comprises 1 to 99 weight percent of poly(ether-b-amide) copolymer.

21. The method of making a gas separation membrane of claim 16, in which the polymer crosslinking solution comprises 2 to 40 weight percent of the diisocyanate polyether according to formula (I).

22. The method of making a gas separation membrane of claim 16, in which the polymer crosslinking solution was heated at a temperature of from 35 to 85° C.

23. The method of making a gas separation membrane of claim 16 which the gas separation membrane was dried at a temperature of from 35 to 50° C.

\* \* \* \* \*

UNITED STATES PATENT AND TRADEMARK OFFICE
CERTIFICATE OF CORRECTION

PATENT NO. : 10,272,394 B2  
APPLICATION NO. : 15/691372  
DATED : April 30, 2019  
INVENTOR(S) : Junyan Yang and Daniel Harrigan Page 1 of 1

It is certified that error appears in the above-identified patent and that said Letters Patent is hereby corrected as shown below:

On the Title Page

In page 2, Column 1, Line 2, item (56), references cited, other publications, cite no. 1, delete "U5" and insert --US--, therefor.

In page 2, Column 2, Line 8, item (56), references cited, other publications, cite no. 3, delete "PolyimidelPoly" and insert --Polyimide/Poly--, therefor.

In page 2, Column 2, Line 11, item (56), references cited, other publications, cite no. 4, before "Recent", insert --"--.

In page 2, Column 2, Line 12, item (56), references cited, other publications, cite no. 4, after "Removal", insert --"--.

In the Specification

In Column 7, Line 59, after "amide-" delete "/".

In Column 8, Line 16, after "amide-" delete "/".

Signed and Sealed this  
Twenty-fourth Day of September, 2019

Andrei Iancu  
*Director of the United States Patent and Trademark Office*